United States Patent [19]

Ichijima

[11] Patent Number: 4,805,049
[45] Date of Patent: Feb. 14, 1989

[54] POSITIONING DEVICE FOR AN AUTOMATIC CHANGING APPARATUS EMPLOYING AND ABSOLUTE ENCODER

[75] Inventor: Akira Ichijima, Tokyo, Japan

[73] Assignee: Kabushiki Kaisha Toshiba, Kawasaki, Japan

[21] Appl. No.: 43,023

[22] Filed: Apr. 27, 1987

[30] Foreign Application Priority Data

Apr. 30, 1986 [JP] Japan .................................. 61-99956
Apr. 30, 1986 [JP] Japan .................................. 61-99957

[51] Int. Cl.$^4$ ............................................. G11B 19/00
[52] U.S. Cl. ........................................ 360/71; 360/69; 318/569; 369/34
[58] Field of Search ........ 414/273, 274, 277, 280–282; 369/34, 178–180, 191, 192, 201; 360/69, 71, 92, 98; 318/569, 574

[56] References Cited

U.S. PATENT DOCUMENTS

| | | | |
|---|---|---|---|
| 3,045,157 | 7/1962 | Jacquet et al. | 318/569 X |
| 3,093,781 | 6/1963 | Anke et al. | 318/569 |
| 3,139,570 | 6/1964 | Jacobson et al. | 318/569 X |
| 3,701,888 | 10/1972 | McDaniel | 318/574 X |
| 3,752,969 | 8/1973 | Kiffmeyer et al. | 318/569 X |

FOREIGN PATENT DOCUMENTS 60-19005 5/1985 Japan .
61-187162 8/1986 Japan ...................................... 360/92

Primary Examiner—John H. Wolff
Attorney, Agent, or Firm—Cushman, Darby & Cushman

[57] ABSTRACT

An automatic changing apparatus includes a holder portion for storing a number of optical disks and a carriage for transferring a desired disk in the holder portion to a disk drive device. The carriage is moved by a drive mechanism and positioned in a desired position by a positioning device. The positioning device includes an absolute encoder which operates in association with the movement of the carriage to detect the position of the carriage. The drive mechanism is driven by a driver circuit in accordance with the difference between the position detected by the encoder and a desired position supplied from an input unit.

12 Claims, 4 Drawing Sheets

POSITIONING DEVICE FOR AN AUTOMATIC CHANGING APPARATUS EMPLOYING AND ABSOLUTE ENCODER

BACKGROUND OF THE INVENTION

The present invention relates to a positioning device, and more specifically, to a positioning device used in an automatic changing apparatus of an optical memory system.

In general, an automatic disk changing apparatus of an optical disk system serves to take out a desired optical disk cassette, from amongst a number of other cassettes arranged in layers, by use of transfer means, and to load the selected cassette into a disk drive system. Also, the transfer means is used to return an optical disk cassette in the drive system to its original position. For example, an AC servomotor is used as a drive source for the transfer means.

Conventionally, a positioning device for positioning the transfer means has a rotary encoder, which rotates in association with the movement of the transfer means. The encoder produces position feedback pulses which are proportional to its rotational angle. When command pulses, which correspond to the distance in which the transfer means is to be moved, are applied to command-pulse input means, the pulses are added to a deviation counter through a pulse-shaping and rotating-direction-control circuit. The pulses integrated by the deviation counter are converted into a speed command voltage by a D/A converter. A servo driver uses this command voltage to drive the AC servomotor.

As the transfer means is moved by means of the motor, the rotary encoder rotates, and delivers position feedback pulses which are proportional to the rotational angle of the encoder. These pulses are applied to the deviation counter via the pulse-shaping and rotating-direction-control circuit. The feedback pulses are subtracted from the command pulses which are applied previously to the counter. As a result, the motor is rotated through an angle corresponding to the result of the subtraction, thereby moving the transfer means to a specified position.

At the start of rotation of the motor, only the command pulses are applied to the deviation counter, so that the motor is accelerated. Thereafter, the frequency of the feedback pulses agrees with that of the command pulses, so that the motor rotates at constant speed. In the end, the command pulses cease to be applied to the counter, and only the feedback pulses continue to be input thereto. Thus, the motor is decelerated.

In the positioning device constructed in this manner, the current position of the transfer means is unknown at the time when power is turned on. Therefore, the device is provided with a sensor for detecting the transfer means being situated in a desired position, next to the rotary encoder. When the power is turned on, the transfer means is moved to a position where it faces the sensor, and this position is detected as the current position of the transfer means. In moving the transfer means to the desired position, the difference between the current position and the desired position is calculated. The input means is supplied with command pulses, which, based on the calculated value, correspond to the distance the transfer means is to be moved.

According to the prior art positioning device, as described above, the transfer means must be moved temporarily to a predetermined position when the power is turned on, thus requiring much starting time. Also, such a device requires a sensor or other position-detecting means, which entails an increase in the number of components. Moreover, the movement of the transfer means must be controlled in consideration of detection data from the sensor, that is, the control of the transfer means is complicated.

SUMMARY OF THE INVENTION

The present invention has been developed in consideration of these circumstances, and is intended to provide a positioning device which has a simple construction, and can quickly position an object of transfer.

In order to achieve the above object, a positioning device according to the present invention comprises a motor for moving an object of transfer; an absolute encoder operating in association with the movement of the object of transfer to detect the position of the object, in the form of a coordinate position in a moving coordinate system of the object, and to deliver a current-position address signal responsive to the detected coordinate position; input means for inputting, as a designated-position address signal, a target coordinate position to which the object of transfer is to be moved; and a driver circuit for driving the motor in accordance with the difference between the designated-position address signal, inputted by means of the input means, and the current-position address signal delivered from the absolute encoder, said driver circuit including cancelling means for cancelling the current-position address signal delivered from the absolute encoder when power is turned on.

DETAILED DESCRIPTION OF THE PREFERRED EMBODIMENT

A preferred embodiment of the present invention will now be described in detail with reference to the accompanying drawings.

Figure 1:
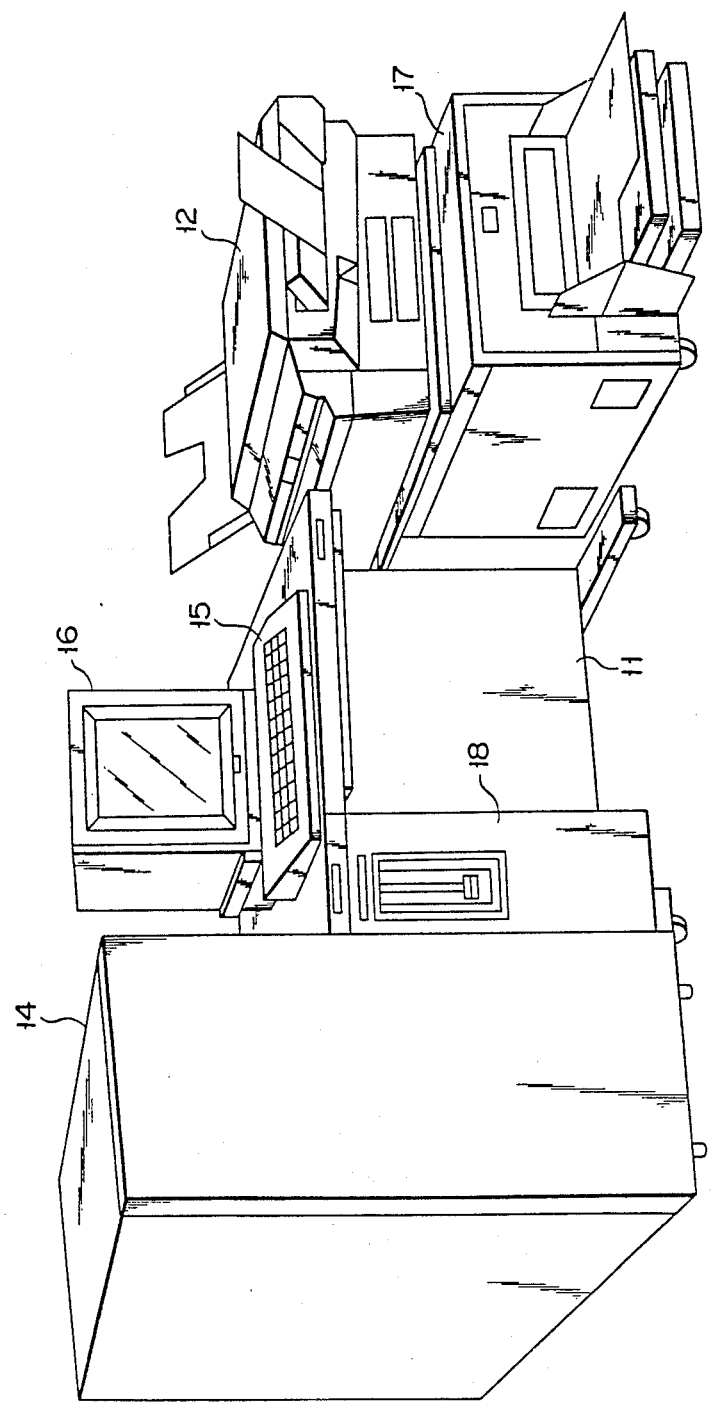
FIG. 1 is a perspective view of an image-information memory and retrieval system having a positioning device according to an embodiment of the present invention.

FIG. 1 shows an image-information memory and retrieval system, which has an automatic disk changing apparatus including a positioning device according to the present invention.

The retrieval system comprises main control unit 11, which is connected to reader unit 12, automatic disk changing apparatus 14 having optical disk drive device 13 therein, keyboard 15, output unit 16, recording unit 17, and floppy disk unit 18. Thus, the main control unit can perform various information processing operations.

Reader unit 12 is composed, for example, of a two-dimensional scanner. It is used to scan an original, such as a document, with a laser beam, in a two-dimensional manner, and to produce an electrical signal responsive to image information on the original.

Optical disk drive device 13 of automatic disk changing apparatus 14 serves to successively store the image information, read by reader unit 12 and supplied through main control unit 11, in an optical disk. Keyboard 15 is used to input a specific retrieval code, which corresponds to the image information, and various operating instructions.

Output unit 16 is composed of a CRT display, for example. It displays the image information read by reader unit 12, image information read from optical disk drive device 13, a retrieval code read from floppy disk unit 18, all supplied through main control unit 11. The output unit also displays the retrieval code inputted by means of keyboard 15. Recording unit 17 delivers, in the form of a hard copy, the information read by reader unit 12 and supplied through control unit 11, or the information read from storage device 13 and supplied through unit 11.

Floppy disk unit 18 is used to store a floppy disk with retrieval data for each image information, consisting of the retrieval code which is input by means of keyboard 15, and a memory address on the optical disk, in which the image information corresponding to the retrieval code is stored. The optical disk has, on each side thereof, an information forming layer which permits recording and reproduction by means of a laser beam or the like. The optical disk is housed in an optical disk cassette.

Figure 2:
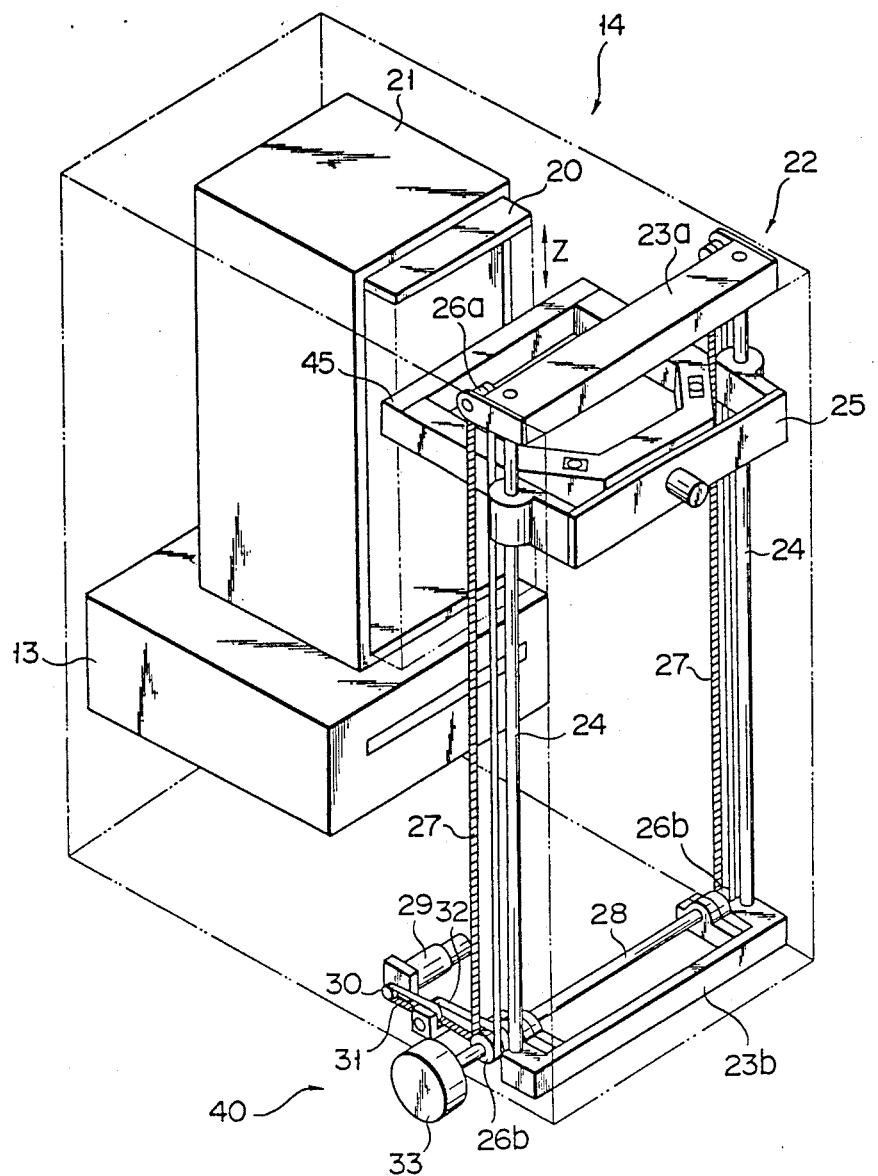
FIG. 2 is a perspective view of an automatic optical-disk changing apparatus including the positioning device.

As shown in FIG. 2, automatic disk changing apparatus 14 includes holder portion 21 for holding a number of optical disk cassettes 20, optical disk drive device 13 for recording on or reproducing information from the optical disk in cassette 20, and transfer unit 22 for transferring cassette 20 between portion 21 and device 13.

Holder portion 21 is constructed so that a number of cassettes 20 can be arranged in layers therein, at predetermined intervals in the Z-direction or vertical direction. A gate aperture (not shown) is formed in the back of holder portion 21. Cassettes 20 are taken into or out of portion 21 through the aperture.

Transfer unit 22 has a pair of guide shafts 24 which extend parallel to each other in the Z-direction. Frames 23a and 23b are fixed to the upper and lower ends, respectively, of shafts 24. Carriage 25 is mounted on shafts 24 so as to be movable along the shafts or in the Z-direction, facing holder portion 21. A pair of rollers 26a are rotatably attached to frame 23a, so as to be situated close to the upper ends of their corresponding shafts 24. Shaft 28 is rotatably mounted on frame 23b. A pair of rollers 26b are attached individually to two opposite ends of shaft 28, so as to be situated near the lower ends of their corresponding shafts 24. Belt 27 is stretched between each corresponding pair of rollers 26a and 26b, so as to extend along its corresponding shaft 24. Part of each belt 27 is fixed to carriage 25.

Transfer unit 22 includes AC servomotor 29 for use as a drive source. The driving force of motor 29 is transmitted to shaft 28 through pulley 30 and belts 31 and 32. Thus, if motor 29 is rotated in either direction, belts 27 are driven by means of shaft 28 and rollers 26b, so that carriage 25 is moved in the Z-direction. Carriage 25 is fitted with grip means 45 for holding optical disk cassette 20. Cassette 20 can be loaded into or removed from holder portion 21 or optical disk storage device 13, by moving carriage 25 with the cassette held by holding means 45.

Figure 3:
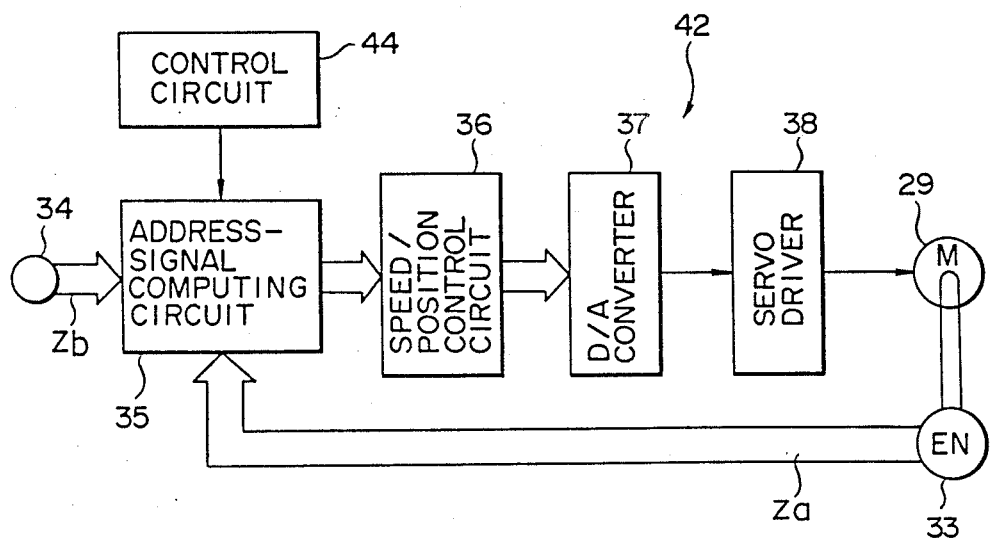
FIG. 3 is a view showing a driver circuit of the positioning device.

Automatic disk changing apparatus 14 comprises positioning device 40 for locating carriage 25 in a desired position. Device 40 includes absolute encoder 33, whose rotating shaft is connected to shaft 28, and rotates integrally therewith. FIG. 3 shows driver circuit 42 for device 40, which includes encoder 33 and motor 29. Circuit 42 has designation-address input means 34, address-signal computing circuit 35, speed/position control circuit 36, D/A converter 37, and servo driver 38.

Figure 4:
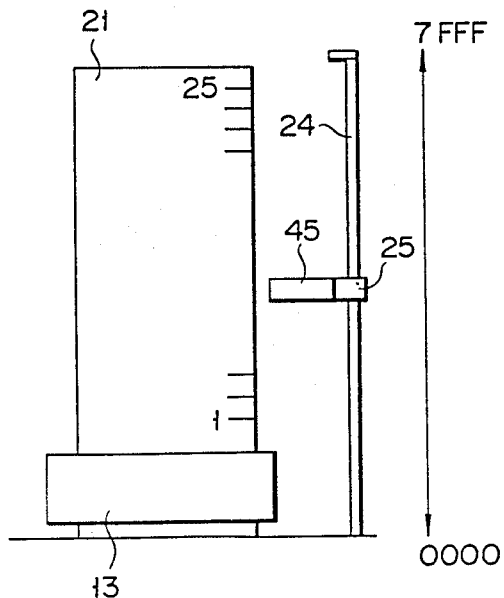
FIG. 4 is a view schematically showing the way an absolute encoder is mounted in position.

Encoder 33 is an absolute-position detector which converts the rotational position of its rotating shaft into a digital code. The encoder detects the position of carriage 25 as a coordinate position, in a moving coordinate system of the carriage, and delivers current-position address signal Za which is indicative of the result of the detection. Holder portion 21 has 25 slots which are each adapted to store a cassette 20. If encoder 33 delivers address signals 0000 to 7FFF, it is adjusted relatively to shaft 28, in the manner shown in FIG. 4. Namely, the shaft of encoder 33 is fixed to shaft 28 so that the output signal of encoder 33 ranges from 4C00 to 4D00 when carriage 25 reaches a position facing the tenth slot, as counted from the position of optical disk drive device 13. By such an adjustment, the level of the output signal of encoder 33 is made lower than 7FFF when carriage 25 is situated at the upper ends of guide shafts 24. When carriage 25 is situated at the lower ends of shafts 24, on the other hand, the output signal level of the encoder is higher than 0000. Since the rotating shaft of encoder 33 rotates endlessly, the encoder delivers address signal 0000 subsequently to signal 7FFF.

Meanwhile, input means 34 is supplied with designated-position address signal Zb, indicative of a target coordinate position to which carriage 25 is moved.

Figure 5:
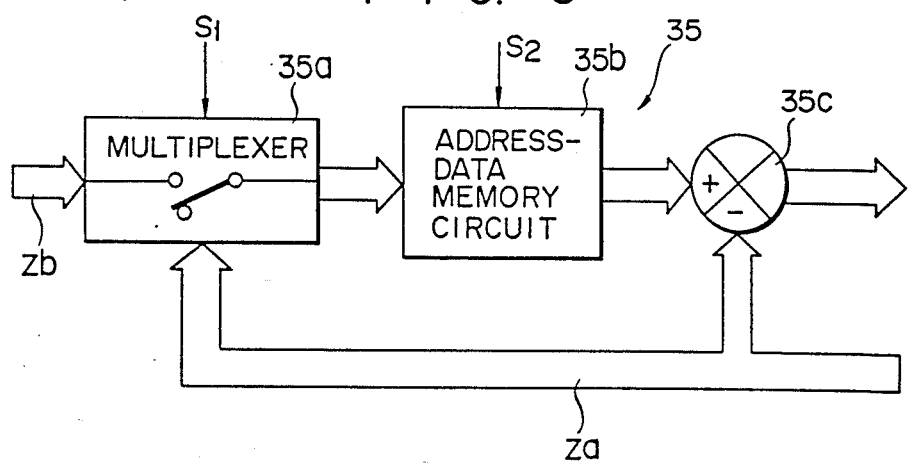
FIG. 5 is an enlarged view showing a part of the driver circuit.

As shown in FIG. 5, address-signal computing circuit 35 includes multiplexer 35a, address-data memory circuit 35b, and subtracter circuit 35c.

When automatic disk changing apparatus 14 is connected to the power supply, multiplexer 35a receives multiplexer control signal S1 from control circuit 44, and causes current-position address signal Za from absolute encoder 33 to be applied to memory circuit 35b. Thereafter, multiplexer 35a causes designated-position address signal Zb from designation-address input means 34 to be applied to circuit 35b.

When the power is turned on, memory circuit 35b receives address-data output timing signal S2, which is delivered from control circuit 44 with a delay of one clock behind multiplexer control signal S1. Then, that address signal which is delivered from multiplexer 35a when the power is turned on, that is, current-position address signal Za, is applied to subtracter circuit 35c. Thereafter, memory circuit 35b supplies circuit 35c with designated-position address signal Zb, which is applied to circuit 35b from input means 34 via multiplexer 35a.

Thereupon, subtracter circuit 35c subtracts current-position address signal Za, which is delivered from absolute encoder 33, from the address signal delivered from memory circuit 35b.

Speed/position control circuit 36 delivers control data in accordance with a subtraction result from subtracter circuit 35c. If the value of the subtraction result or the difference between the address signal from memory circuit 35b and signal Za from encoder 33 is large, control circuit 36 produces control data for moving carriage 25 at a constant speed (high speed). If the difference lessens, that is, if the values of signals from memory circuit 35b and encoder 33 approach each other, control circuit 36 delivers control data for moving carriage 25 in a decelerating manner. Further, circuit 36 compares signals Za and Zb, and controls the rotating direction of AC servomotor 29, that is, the moving direction of carriage 25, in accordance with the result of the comparison.

Figure 6:
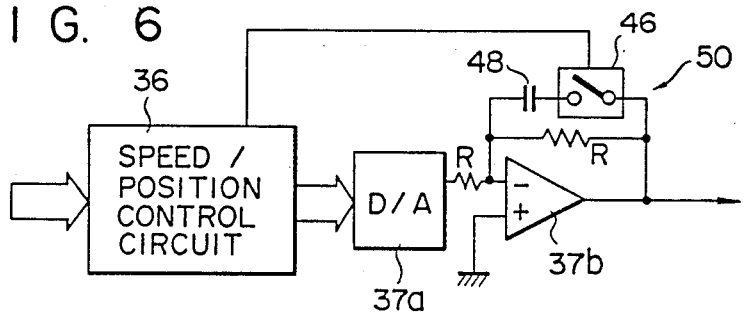
FIG. 6 is an enlarged view showing another part of the driver circuit.

D/A converter 37 produces an analog output or speed command voltage, which corresponds to the control data delivered from control circuit 36. As shown in FIG. 6, converter 37 includes converter body 37a, amplifier 37b, and series circuit 50 of switching means 46 and capacitor 48. Circuit 50 is connected in parallel with amplifier 37b. Switching means 46 is on-off-controlled by control circuit 36. Circuit 36 supplies switching means 46 with a switching signal which turns on the switching means when the difference between designated-position address signal Zb and current-position address signal Za is relatively large, or otherwise, turns off the switching means.

Servo driver 38 drives AC servomotor 29 in accordance with the speed command voltage delivered from D/A converter 37.

The manner in which desired optical disk cassette 20 is loaded into optical disk drive device 13 from holder portion 21, in the image-information storage and retrieval system constructed in the afore-mentioned manner, will now be described.

First, when the storage and retrieval system is connected to the power supply, multiplexer control signal S1 is supplied from control circuit 44 to multiplexer 35a. As a result, current-position address signal Za from absolute encoder 33, which is indicative of the position of carriage 25 when the power is turned on, is applied to address-data memory circuit 35b via multiplexer 35a. Timing signal S2 from control circuit 44 is applied to memory circuit 35b one clock after control signal S1 is applied to multiplexer 35a. Thereupon, signal Za stored in circuit 35b is applied to subtracter circuit 35c.

Also, subtracter circuit 35c is supplied with current-position address signal Za from encoder 33. Thus, the address signals delivered from memory circuit 35b and encoder 33 are identical, so that the subtraction result is zero. While the power is on, therefore, AC servomotor 29 is not driven, and carriage 25 is located in the position which corresponds to the time when the power is turned on.

Thereafter, an operator inputs a processing instruction, that is, a signal indicative of the specific cassette to be loaded into optical disk drive device 13, on main control unit 11. In response to this instruction signal, unit 11 delivers designated-position address signal Zb, which is indicative of the target position to which carriage 25 is to be moved, that is, the coordinate position of desired cassette 20. After it is delivered to input means 34, address signal Zb is applied to subtracter circuit 35c via multiplexer 35a and memory circuit 35b. Circuit 35c is also supplied with current-position address signal Za from absolute encoder 33, which is indicative of the coordinate position of carriage 25. In subtracter circuit 34c, address signal Za is subtracted from address signal Zb, and the calculation result is applied to speed/position control circuit 36.

In accordance with the subtraction result, control circuit 36 delivers control data for controlling speed and direction. Receiving the control data, D/A converter 37 delivers a speed command voltage. In accordance with the command voltage, servo driver 28 drives motor 29. As a result, carriage 25 starts to move toward the desired coordinate position.

Encoder 33 detects the shifted position of carriage 25, in the form of a coordinate position in the moving coordinate system of the carriage. The detected position is applied, as current-position address signal Za, to subtracter circuit 35c, as required. If the difference between designated-position address signal Zb and signal Za is relatively great, control circuit 36 delivers control data for moving carriage 25 at a constant speed. As carriage 25 approaches the target coordinate position, thus reducing the value of the subtraction result, circuit 36 delivers control data for moving the carriage in a decelerating manner. As a result, the rotating speed of motor 29 and therefore, the moving speed of carriage 25, are lowered.

Figure 7:
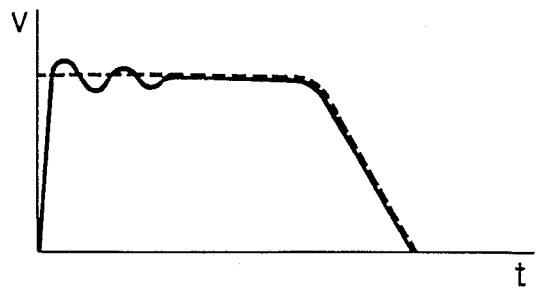
FIGS. 7 and 8 are views representing the time-based transitions of the carriage transfer speed, respectively.
Figure 8:
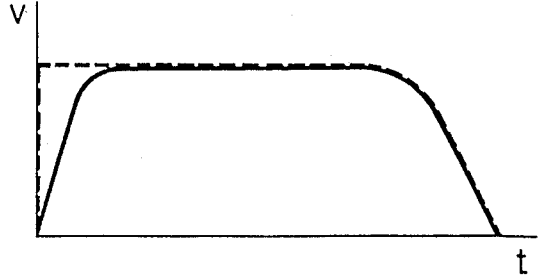

If the value of the subtraction result is large at the start of the movement of carriage 25, the carriage is accelerated suddenly, and its speed is unstable, as shown in FIG. 7. According to this embodiment, however, if the difference between the address signals is great at the start of the carriage's movement, control circuit 36 delivers a switching signal to turn on switching means 46, thereby preventing a voltage from being applied suddenly from servo driver 38 to motor 29. Thus, at the start of the movement, the moving speed of carriage 25 can be increased gently and kept stable, as shown in FIG. 8.

When carriage 25 is moved to the target position, cassette 20 is taken out of holder portion 21, with the aid of grip means 45 attached to the carriage. Thereafter, by repeating the aforesaid operation, carriage 25 is moved to the position where it faces a disk slot of optical disk drive device 13, and cassette 20 is loaded into device 13 with the aid of grip means 45. In returning cassette 20 from device 13 to holder portion 21, carriage 25 is moved in the same manner as aforesaid.

According to the automatic disk changing apparatus, having the positioning device constructed in this manner, the position of the carriage is detected by means of an absolute encoder. Therefore, the carriage can be moved to the target position by only inputting a designated-position address signal, without using a sensor or other special means for position detection. When the apparatus is connected to the power supply, moreover, the coordinate position of the carriage, which is detected by the encoder, is cancelled by cancelling means, i.e., an address-signal computing circuit. Accordingly, the carriage is located in the position which corresponds to the time when the power is turned on. Therefore, the carriage need not be moved to any predetermined reference position when the power is turned on, and can be moved to the target position the moment the power is turned on. Thus, the optical disks can be replaced quickly.

What is claimed is:

1. A positioning device for positioning an object being transferred along a predetermined moving coordinate system, comprising:
    means for moving the object of transfer;
    absolute encoder means having an input shaft rotating interlockingly with the movement of the object of transfer, for detecting the rotational position of the input shaft which corresponds to the coordinate position of the object to deliver a current-position address signal as the detected coordinate position;

means for outputting a designated-position address signal as a target coordinate position to which the object of transfer is moved; and driving means having means for calculating the difference between the designated-position address signal from the output means and the current-position address signal from the absolute encoder, for driving the moving means based on the calculated difference, said driving means including means for substituting the current-position signal from the absolute encoder for the designated-position address signal so that said calculated difference becomes zero when power to the positioning device is turned on.

2. A positioning device according to claim 1, wherein said calculating means includes a subtractor circuit for subtracting the current-position address signal from the designated-position address signal, and said canceling means includes means for applying the current-position address signal, as the designated-position address signal, to the subtracter circuit when the power is turned on.

3. A positioning device according to claim 2, wherein said address-signal applying means includes a multiplexer supplied with the designated-position address signal from the output means and the current-position address signal from the absolute encoder, an address-data memory circuit for storing an output signal from the multiplexer and applying the stored signal to the subtracter circuit, and a control circuit for applying a control signal to the multiplexer so as to cause the multiplexer to output the current-position address to the memory circuit, when the power is turned on, and for applying a timing signal, after the current-position address signal is stored in the memory circuit, to the memory circuit so as to cause the memory circuit to output the stored current-position address signal to the subtracter circuit.

4. A positioning device according to claim 1, wherein said moving means includes a motor, and said driving means includes a speed/position control circuit for delivering control data for controlling the rotating speed and direction of the motor in accordance with said calculated difference between the target coordinate position and the coordinate position from the absolute encoder.

5. A positioning device according to claim 4, wherein said driving means includes a D/A converter for delivering a speed command voltage in accordance with the control data from the speed/position control circuit, and a servo driver for driving the motor in accordance with the speed command voltage from the D/A converter.

6. A positioning device according to claim 1, wherein said moving means includes a motor said driving means includes means for controlling an initial rotating speed of the motor in accordance with the difference between the target coordinate position and the coordinate position from the absolute encoder.

7. A positioning device according to claim 1, wherein said moving means includes a motor, and said driving means includes means for preventing an initial rotating speed of the motor from being suddenly increased when said calculated difference is larger than a predetermined valve.

8. An automatic changing apparatus for loading into or removing an information memory medium from a medium drive device, comprising:

a holder portion, stored with a number of memory media;

a carriage, movable along a moving coordinate system and capable of facing the medium drive device and the holder portion;

means, supported by the carriage, for holding the memory medium;

means for moving the carriage; and means for positioning the carriage in a desired position in the coordinate system, said positioning means including an absolute encoder having an input shaft rotating interlockingly with the movement of the carriage, for detecting the absolute rotational position of the input shaft which corresponds to the coordinate position of the carriage to deliver a current-position address signal as the detected coordinate position, means for outputting a designated-position address signal as a target coordinate position to which the carriage is moved, and driving means for driving the moving means based on the designated-position address signal from the output means and the current-position address signal detected by the absolute encoder.

9. An apparatus according to claim 8, wherein said memory media are arranged along a direction parallel to the coordinate system, and when said carriage is moved to the target coordinate position, the holding means holds that memory medium in the hold portion which is located at a position corresponding to the target coordinate position, and when the carriage, along with the memory medium held by the holding means, is moved to a coordinate position facing the medium drive device, the holding means loads the memory medium to the drive device.

10. An apparatus according to claim 8, wherein said moving means includes a motor, and means for converting the rotational movement of the motor into a linear movement and transmitting the linear movement to the carriage, and said input shaft of the absolute encoder is coupled to the moving means so as to rotate integral with the rotation of the motor.

11. A positioning device according to claim 8, wherein said driving means includes means for calculating the difference between the designated-position address signal and the current-position address signal, and drives the moving means based on the difference.

12. A positioning device according to claim 11, wherein said driving means includes means for cancelling the current-position address signal from the absolute encoder so that said calculated difference becomes zero when a power is turned on.

* * * * *